United States Patent
Yokota et al.

(10) Patent No.: US 8,078,176 B2
(45) Date of Patent: Dec. 13, 2011

(54) RADIO COMMUNICATION APPARATUS AND RADIO COMMUNICATION METHOD

(75) Inventors: Tomoyoshi Yokota, Yokohama (JP); Tomohiro Miki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 506 days.

(21) Appl. No.: 12/360,695

(22) Filed: Jan. 27, 2009

(65) Prior Publication Data

US 2010/0035614 A1 Feb. 11, 2010

(30) Foreign Application Priority Data

Jan. 29, 2008 (JP) ................... 2008-018381
Jan. 29, 2008 (JP) ................... 2008-018382

(51) Int. Cl.
*H04W 36/00* (2009.01)
(52) U.S. Cl. ............... 455/439; 455/422.1; 455/432.1; 455/574; 455/436; 370/331
(58) Field of Classification Search ............... 455/422.1, 455/432.1, 574, 436; 370/331
See application file for complete search history.

(56) References Cited

U.S. PATENT DOCUMENTS

| 7,500,117 B2 * | 3/2009 | Mizusawa ...................... 713/300 |
| 7,515,928 B2 | 4/2009 | Kang |
| 7,848,776 B2 * | 12/2010 | Akiba et al. ............... 455/552.1 |
| 2006/0223465 A1 * | 10/2006 | Akiba et al. ............... 455/127.4 |

FOREIGN PATENT DOCUMENTS

| JP | 2001095029 A | 4/2001 |
| JP | 2006135953 A | 5/2006 |
| JP | 2007-266987 | 10/2007 |
| KR | 20060039749 A | 5/2006 |
| KR | 20060109693 A | 10/2006 |

OTHER PUBLICATIONS

Korean language office action dated Sep. 28, 2010 and its English language translation for corresponding Korean application 1020090006883 lists the references above.

* cited by examiner

*Primary Examiner* — Nick Corsaro
*Assistant Examiner* — Quan Hua
(74) *Attorney, Agent, or Firm* — DLA Piper LLP (US)

(57) ABSTRACT

A radio communication apparatus includes a battery voltage monitor configured to acquire a dropped amount of an output voltage in a case where a network connection unit is connected to at least one of radio communication networks used in a handover; and an operation controller configured to stop a handover controller from executing the handover to the other radio communication network when a predicted voltage obtained by subtracting the dropped amount from the output voltage is not more than a predetermined threshold.

7 Claims, 7 Drawing Sheets

| DROPPED AMOUNT Vd \ BATTERY OUTPUT VOLTAGE (Vy) | 4.2 | 4.1 | 4 | 3.9 | 3.8 | 3.7 | 3.6 | 3.5 | 3.4 |
|---|---|---|---|---|---|---|---|---|---|
| RADIO COMMUNICATION NW1 | 0.1 | 0.11 | 0.12 | 0.13 | 0.14 | 0.15 | 0.16 | 0.17 | 0.18 |
| RADIO COMMUNICATION NW2 | 0.12 | 0.13 | 0.14 | 0.15 | 0.16 | 0.17 | 0.18 | 0.19 | 0.2 |
| RADIO COMMUNICATION NW3 | 0.14 | 0.15 | 0.16 | 0.17 | 0.18 | 0.19 | 0.2 | 0.21 | 0.22 |
| ... | ... | ... | ... | ... | ... | ... | ... | ... | ... |
| RADIO COMMUNICATION NWn | 0.15 | 0.16 | 0.17 | 0.18 | 0.19 | 0.2 | 0.21 | 0.22 | 0.23 |

TB

RADIO COMMUNICATION APPARATUS AND RADIO COMMUNICATION METHOD

CROSS REFERENCE TO RELATED APPLICATION

This application is based upon and claims the benefit of priority from the prior Japanese Patent Applications No. P2008-18381 and P2008-18382, filed on Jan. 29, 2008; the entire contents of which are incorporated herein by reference.

BACKGROUND OF THE INVENTION

1. Field of the Invention

The present invention relates to a radio communication apparatus that operates with a battery and is connectable to multiple radio communication networks, and also to a radio communication method used in the radio communication apparatus.

2. Description of the Related Art

In recent years, along with advancement of radio communication technologies, radio communication apparatuses connectable to multiple radio communication networks employing different communication schemes have been proposed. Such a radio communication apparatus (for example, mobile communication terminal) connectable to multiple radio communication networks generally operates with a battery, and includes multiple network connection units (for example, connection units for a cellular phone network and for a wireless LAN) corresponding to the number of the connectable radio communication networks. In addition, each network connection unit generally has a power amplifier for amplifying a radio signal.

When the radio communication apparatus executes a handover from a currently-connected radio communication network to another radio communication network, the radio communication apparatus simultaneously activates both of a power amplifier of a network connection unit used for transmission and reception of a radio signal to and from the currently-connected radio communication network, that is, a radio communication network of a handover source, and a power amplifier of a network connection unit used for transmission and reception of a radio signal to and form a radio communication network of a handover destination. Accordingly, the radio communication apparatus can execute a so-called soft handover that is a handover executed with disconnection time of on-going communication being minimized.

However, the conventional radio communication apparatus mentioned above has the following problem. Specifically, when the radio communication apparatus executes the soft handover, is the radio communication apparatus simultaneously activates both of the power amplifier used for transmission and reception of the radio signal to and from the radio communication network of the handover source, and the power amplifier used for transmission and reception of the radio signal to and from the radio communication network of the handover destination. Therefore, an output voltage of the battery that is driving the power amplifiers drops.

Specifically, assume a case where the battery is used for more than a certain period of time after being charged, and then multiple power amplifiers are driven with the battery having its output voltage already dropped to a level lower than the output voltage of the battery fully charged. In this case, the output voltage may drop to a level which causes a protection circuit to operate. When the output voltage drops to the level which causes a protection circuit to operate, the on-going communication is disconnected.

SUMMARY OF THE INVENTION

Then, the present invention has been made in consideration of a situation mentioned above. An objective of the present invention is to provide a radio communication apparatus and a radio communication method that can prevent an on-going communication from being disconnected at a time of a handover due to drop of an output voltage of a battery.

In order to solve the problem mentioned above, the present invention has following aspects. To begin with, a first aspect of the present invention is summarized as a radio communication apparatus (radio communication apparatus 100) that operates with a battery (battery 119) and is connectable to multiple radio communication networks (radio communication network 1 to radio communication network 3), the radio communication apparatus including: a network connection unit (network connection units $101_1$, $101_2$ and $101_3$) configured to connect to the radio communication network using a radio signal (radio signal RS); a handover controller (handover controller 107) configured to control a handover from a currently-connected radio communication network (for example, radio communication network 1) to other radio communication network (for example, radio communication network 2); a voltage detector (battery voltage monitor 121) configured to detect an output voltage (output voltage Vy) outputted by the battery; a dropped voltage amount acquiring unit (battery voltage monitor 121) configured to acquire a dropped amount of the output voltage (for example, dropped amount Vd) when the network connection unit is connected to one or more of the radio communication networks used in the handover; and an operation controller (operation controller 109) configured to stop the handover controller from executing a handover to the other radio communication network when a predicted voltage (predicted voltage Vexp) obtained by subtracting the dropped amount from the associated output voltage is not more than a predetermined threshold (threshold voltage Vthld or lower limit voltage Vlmt).

According to such a radio communication apparatus, a handover (for example, a soft handover) to the other radio communication network is stopped when the predicted voltage obtained by subtracting the dropped amount of the voltage from the associated output voltage is not more than the predetermined threshold, the voltage dropped with an execution of the handover. Accordingly, the disconnection of an on-going communication due to the output voltage dropped to a level which causes a protection circuit to operate can be prevented.

A second aspect of the present invention is summarized as the radio communication apparatus according to the first aspect of the present invention, further including a quality determination unit (communication quality determination unit 105) configured to determine whether or not quality (for example, RSSI) of the radio signal or information included in the radio signal deteriorates to a level lower than a predetermined condition; wherein the operation controller determines whether or not to stop execution of the handover by the handover controller, when the quality determination unit determines that the quality deteriorates to a level lower than the predetermined condition.

A third aspect of the present invention is summarized as the radio communication apparatus according to the first or second aspect of the present invention, wherein the operation controller determines whether or not to stop execution of the handover by the handover controller when the output voltage detected by the voltage detector is not more than a predetermined value (determination start voltage Vs).

A fourth aspect of the present invention is summarized as a radio communication method used in the radio communication apparatus according to the first aspect of the present invention, including a network connection unit that operates with a battery and is connectable to multiple radio communication networks using a radio signal; the radio communication method comprising the steps of: controlling a handover from a currently-connected radio communication network to other radio communication network; detecting an output voltage outputted by the battery; acquiring a dropped amount of the output voltage in a case where the network connection unit is connected to the one or more radio communication networks used in the handover; and stopping execution of the handover to the other radio communication network when a predicted voltage obtained by subtracting the dropped amount from the associated output voltage is not more than a predetermined threshold.

A fifth aspect of the present invention is summarized as a radio communication apparatus (radio communication apparatus 100) that operates with a battery (battery 119) and is connectable to multiple radio communication networks (radio communication network 1 to radio communication network 3), the radio communication apparatus including: a voltage detector (battery voltage monitor 121) configured to detect an output voltage (output voltage Vy) outputted by the battery; and a storage unit (battery voltage drop table storage 123) configured to store, for each of the radio communication networks, a battery voltage drop table (battery voltage drop table TB) indicating the dropped amount of the output voltage (dropped amount Vd) in a case where the radio communication apparatus is connected to the radio communication networks.

According to such a radio communication apparatus, a handover (for example, a soft handover) to the other radio communication network is stopped when the predicted voltage obtained by subtracting the dropped amount of the voltage from the associated output voltage is not more than the predetermined threshold, the voltage dropped with an execution of the handover. Accordingly, the disconnection of an on-going communication due to the output voltage dropped to a level which causes a protection circuit to operate can be prevented.

A sixth aspect of the present invention is summarized as the radio communication apparatus according to the fifth aspect of the present invention, including: a controller (operation controller 109) configured to control so as to predict the output voltage when the radio communication apparatus is connected to a predetermined radio communication network among the plurality of radio communication networks, using the output voltage in a case where before the radio communication apparatus is connected to the predetermined radio communication network, and the dropped amount of the output voltage in a case where the radio communication apparatus is connected to the predetermined radio communication network, the dropped amount outputted on the basis of the battery voltage drop table stored in the storage unit.

A seventh aspect of the present invention is summarized as the radio communication apparatus according to the fifth aspect of the present invention, wherein in the battery voltage drop table, values of the dropped amount of the output voltage in a case where the radio communication apparatus is connected to the radio communication network are respectively associated with a plurality of various values of the output voltage before the radio communication apparatus is connected to the radio communication network.

An eighth aspect of the present invention is summarized as the radio communication apparatus according to the fifth aspect of the present invention, including: a determination unit (operation controller 109) configured to determine whether or not to execute a handover from a currently-connected radio communication network to other radio communication network on the basis of the predicted voltage (predicted voltage Vexp) obtained by subtracting the dropped amount from the associated output voltage.

A ninth aspect of the present invention is summarized as the radio communication apparatus according to the eighth aspect of the present invention, including: a handover controller (handover controller 107) configured to execute the handover from the currently-connected radio communication network to the other radio communication network when the predicted voltage exceeds a predetermined threshold (threshold voltage Vthld or lower limit voltage Vlmt) on the basis of the determination result of the determination unit, and to stop execution of the handover from the currently-connected radio communication network to the other radio communication network when the predicted voltage is not more than the predetermined threshold.

According to the aspects of the present invention, it is possible to provide a radio communication apparatus and a radio communication method which prevents an disconnection of an on-going communication at the time of handover due to a drop of an output voltage of a battery.

DETAILED DESCRIPTION OF THE INVENTION

Figure 1:
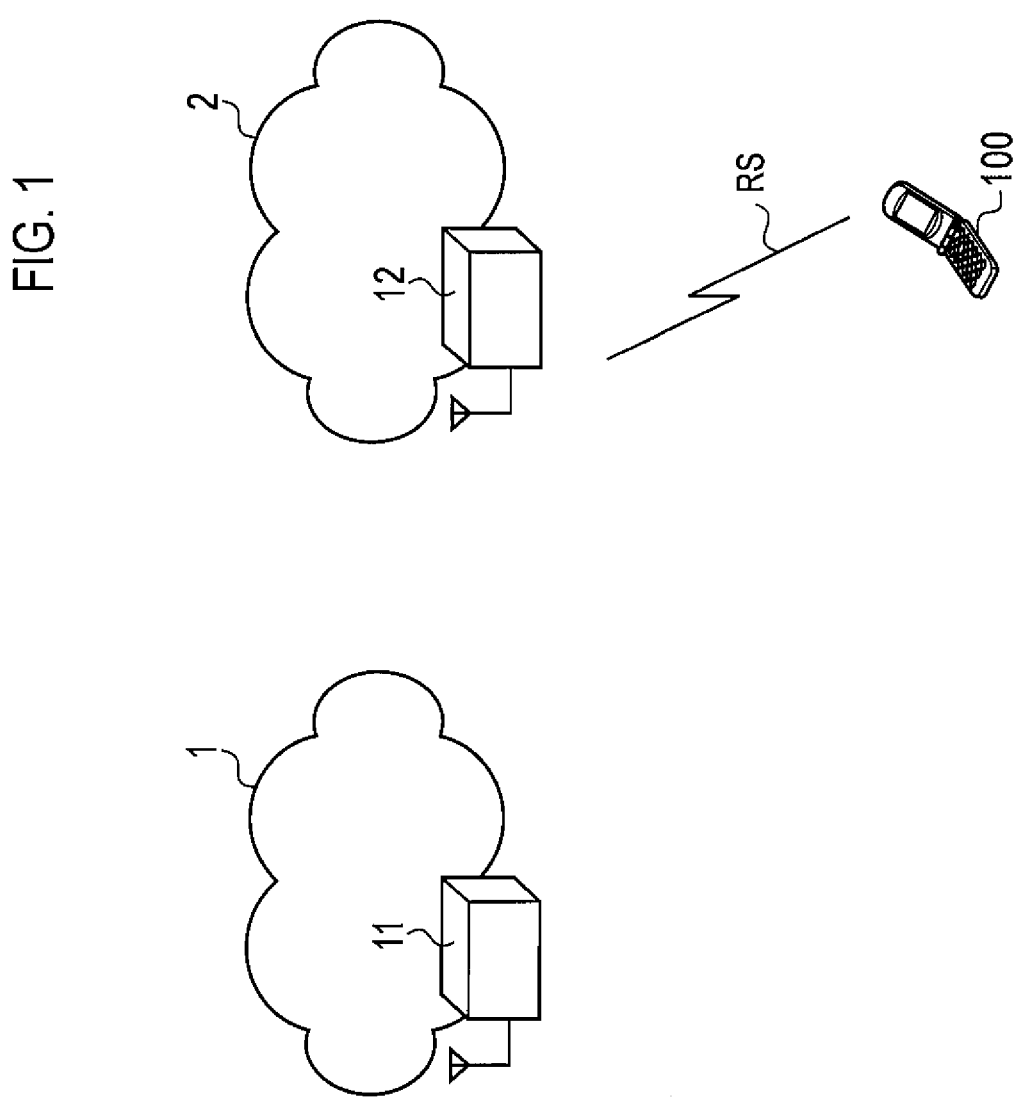
FIG. 1 is an overall schematic configuration diagram of a communication network according to an embodiment of the present s invention.

Next, an embodiment of the present invention will be described. Specifically, description will be given on (1) an overall schematic configuration of a communication network, (2) a functional block configuration of a radio communication apparatus, (3) operation of the radio communication apparatus, (4) effects and advantages, and (5) other embodiments.

Note that the same or similar portions are denoted by the same or similar reference numerals in the descriptions of the drawings below. It should be noted, however, that the drawings are schematic only, and that ratio of each dimension and the like differ from those in reality.

Accordingly, specific dimensions and the like should be determined in consideration of the descriptions below. In addition, some of the dimensional relations and ratios differ in the drawings as a matter of course.

(1) Overall Schematic Configuration of Communication Network

FIG. 1 is an overall schematic configuration diagram of a communication network according to the present embodiment. As shown in FIG. 1, a communication network is formed of radio communication networks 1 to 3 in the present embodiment. Different communication schemes are employed for the radio communication networks 1 to 3.

The radio communication network 1 is, for example, a cellular phone network that employs a cdma scheme (for example, cdma2000). The radio communication network 2 employs mobile WiMAX, for example, compliant with IEEE802.16E. The radio communication network 3 employs a wireless LAN, for example, compliant with IEEE802.11g, etc.

The radio communication networks 1 to 3 respectively include radio base stations 11 to 13 each configured to transmit and receive a radio signal RS to and from a radio communication apparatus 100.

The radio communication apparatus 100 is connectable to multiple radio communication networks, specifically, the radio communication networks 1 to 3 using the radio signal RS. In the present embodiment, the radio communication apparatus 100 is a mobile small-sized radio communication terminal and operates with a battery 119 (not shown in FIG. 1, see FIG. 2).

(2) Functional Block Configuration of the Radio Communication Apparatus

Next, with reference to FIGS. 2 and 3, a functional block configuration of the radio communication apparatus 100 will be described.

(2.1) Overall Block Configuration

Figure 2:
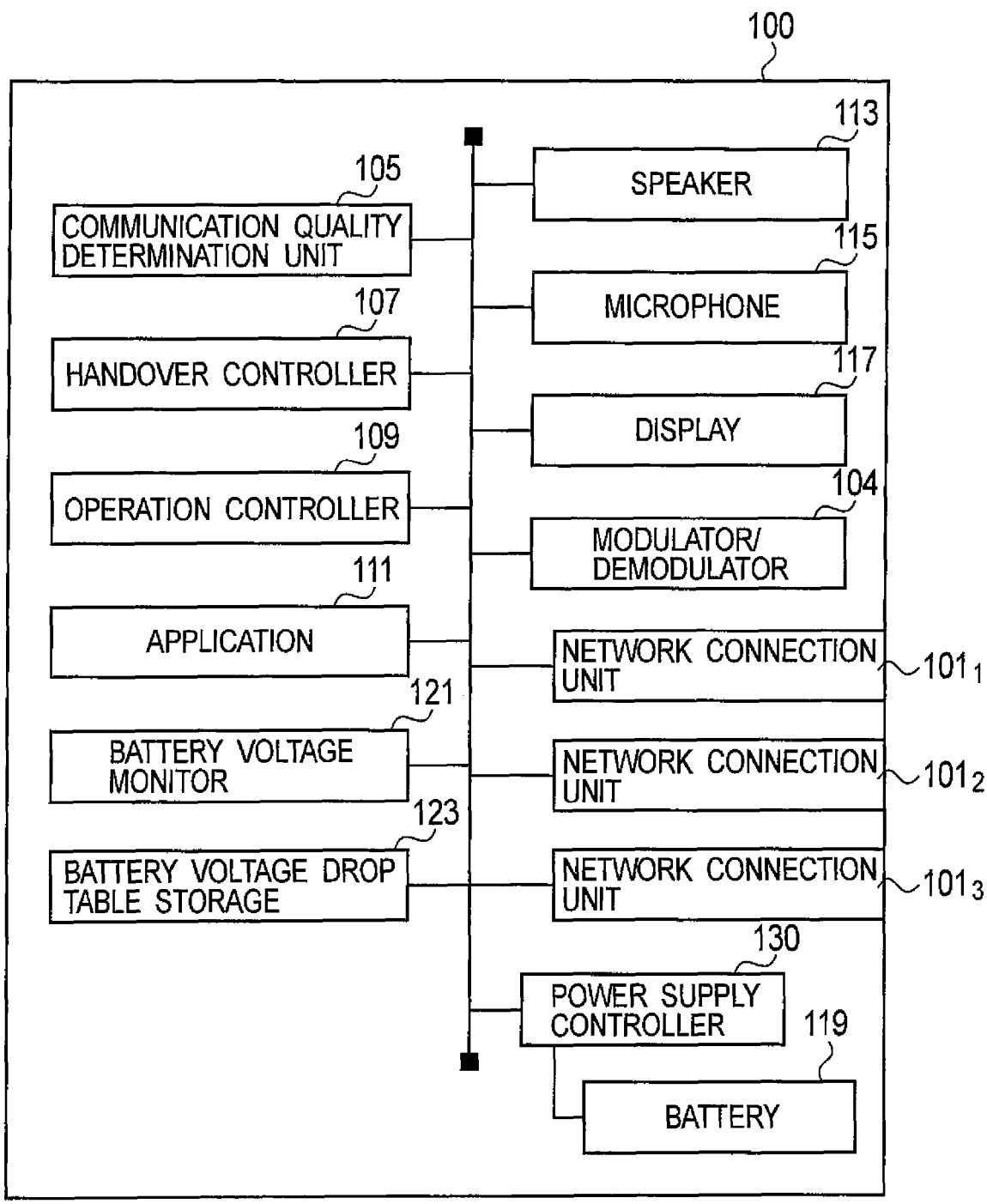
FIG. 2 is a functional block configuration diagram of a radio communication apparatus 100 according to the embodiment of the present invention.

FIG. 2 is a functional block configuration diagram of the radio communication apparatus 100. As shown in FIG. 2, the radio communication apparatus 100 includes network connection units $101_1$, $101_2$, and $101_3$, a modulator/demodulator 104, a communication quality determination unit 105, a handover controller 107, an operation controller 109, an application 111, a speaker 113, a microphone 115, and a display 117.

Hereinafter, portions related to the present invention will be mainly described. Therefore, it should be noted that the radio communication apparatus 100 may include a block that is necessary when realizing a function as the radio communication apparatus 100 but not shown or omitted in the description below.

The radio communication apparatus 100 includes a battery 119 that supplies power to each functional block. In order to control an operation of the radio communication apparatus 100 with respect to the battery 119, the radio communication apparatus 100 further includes a battery voltage monitor 121, a battery voltage drop table storage 123, and a power supply controller 130.

The network connection unit $101_1$ provides a communication interface for connecting to the radio communication network 1 (cdma2000), specifically to the radio base station 11, using the radio signal RS.

The network connection unit $101_2$ provides a communication interface for connecting to the radio communication network 2 (mobile WiMAX), specifically to the radio base station 12, using the radio signal RS.

The network connection unit $101_3$ provides a communication interface for connecting to the radio communication network 3 (wireless LAN), specifically to the radio base station 13, using the radio signal RS.

The modulator/demodulator 104 executes modulation processing on an IP packet outputted from an application 111, and demodulation processing on a signal outputted from the network connection units $101_1$, $101_2$ and $101_3$.

The communication quality determination unit 105 acquires communication quality (for example, RSSI) of the radio signal RS, and quality of information (for example, IP packet outputted from the application 111) included in the radio signal RS.

The communication quality determination unit 105 also determines whether or not the acquired communication quality deteriorates to a level lower than a communication quality in a predetermined condition. Particularly, in the present embodiment, the communication quality determination unit 105 determines the communication quality of the radio signal RS on the basis of three types of communication quality degradation conditions. Specifically, the communication quality determination unit 105 determines the communication quality of the radio signal RS on the basis of first, second, and third quality degradation conditions.

The first quality degradation condition corresponds to the communication quality which is in a level that a handover to other radio communication network is to be executed. The second quality degradation condition corresponds to the communication quality which is in a level that a handover to other radio communication network is to be prepared. The third quality degradation condition corresponds to the communication quality which is in a level that the determination of the dropped amount Vd of an output voltage Vy of the battery 119 resulting from a handover to other radio communication network is to be started.

In other words, among the communication qualities corresponding to the first to the third quality degradation conditions, the communication quality corresponding to the third quality degradation condition is the best, and the communication quality corresponding to the first quality degradation condition is the poorest.

The handover controller 107 controls a handover from a currently-connected radio communication network (for example, radio communication network 1) to the other radio communication network (for example, radio communication network 2).

The handover controller 107 determines whether or not to execute the handover to the other radio communication network on the basis of multiple parameters, specifically, the communication quality of the radio signal RS (and information included in the radio signal RS), a QoS threshold of the application (usable communication band (communication speed) propagation delay, etc.), and an accounting system with the use of the radio communication network.

Furthermore, in the present embodiment, the handover controller 107 also uses the dropped amount Vd of the output voltage Vy of the battery 119 resulting from the handover to the other radio communication network as a parameter for determining whether or not to execute the handover.

Specifically, the handover controller 107 executes the handover from the currently-connected radio communication network to the other radio communication network on the basis of the determination result of the operation controller 109, when the predicted voltage Vexp is over the lower limit voltage Vlmt (predetermined threshold). In addition, the handover controller 107 stops execution of the handover from the currently-connected radio communication network to the other radio communication network, when the predicted voltage Vexp is not more than the lower limit voltage Vlmt.

The operation controller 109 controls operation of the radio communication apparatus 100. Particularly, in the present embodiment, the operation controller 109 controls whether or not the handover is to be executed on the basis of the dropped amount Vd of the output voltage Vy of the battery 119 resulting from the handover to the other radio communication network.

The operation controller 109 controls so as to predict the output voltage Vy when the radio communication apparatus 100 is connected to a predetermined radio communication network, using the output voltage Vy in a case where before the radio communication apparatus 100 is connected to the predetermined radio communication network, and a dropped amount Vd of the output voltage Vy in a case where the radio communication apparatus 100 is connected to the predetermined radio communication network, the dropped amount Vd outputted on the basis of the battery voltage drop table TB stored in the battery voltage drop table storage 123.

Specifically, on the basis of information given by the battery voltage monitor 121, the operation controller 109 determines whether or not the predicted voltage Vexp is not more than the threshold voltage Vthld (predetermined threshold), the predicted Vexp being obtained by subtracting the dropped amount Vd of the output voltage Vy from the current output voltage Vy of the battery 119, the dropped amount Vd of the output voltage Vy resulting from the handover to the other radio communication network.

When the predicted voltage Vexp is not more than the threshold voltage Vthld and is over the lower limit voltage Vlmt, the operation controller 109 executes the handover, specifically, the soft handover to the other radio communication network by the handover controller 107. In addition, when the predicted voltage Vexp is not more than the lower limit voltage Vlmt, the operation controller 109 stops execution of the soft handover. Additionally, an assumption is made that the predicted voltage V'exp when the radio communication apparatus 100 is connected only to the other radio communication network is not more than the lower limit voltage Vlmt, the operation controller 109 stops execution of the handover, specifically a hard handover to the other radio communication network by the handover controller 107.

In other words, the operation controller 109 determines, on the basis of the predicted voltage Vexp, whether or not to execute the handover from the currently-connected radio communication network to the other radio communication network. In the present embodiment, the operation controller 109 constitutes a determination unit.

In the present embodiment, when the communication quality determination unit 105 determines that the communication quality deteriorates to a level lower than the third quality degradation condition (predetermined condition), the operation controller 109 can start a determination as to whether or not the handover controller 107 is to stop execution of the handover. In other words, when the communication quality does not deteriorate to a level lower than the third quality degradation condition, the operation controller 109 does not determine whether the predicted voltage Vexp is not more than the threshold voltage Vthld.

Additionally, when the output voltage Vy detected by the battery voltage monitor 121 is not more than the determination start voltage Vs (predetermined value), the operation controller 109 can start a determination as to whether or not the handover controller 107 is to stop execution of the handover.

Figure 7:
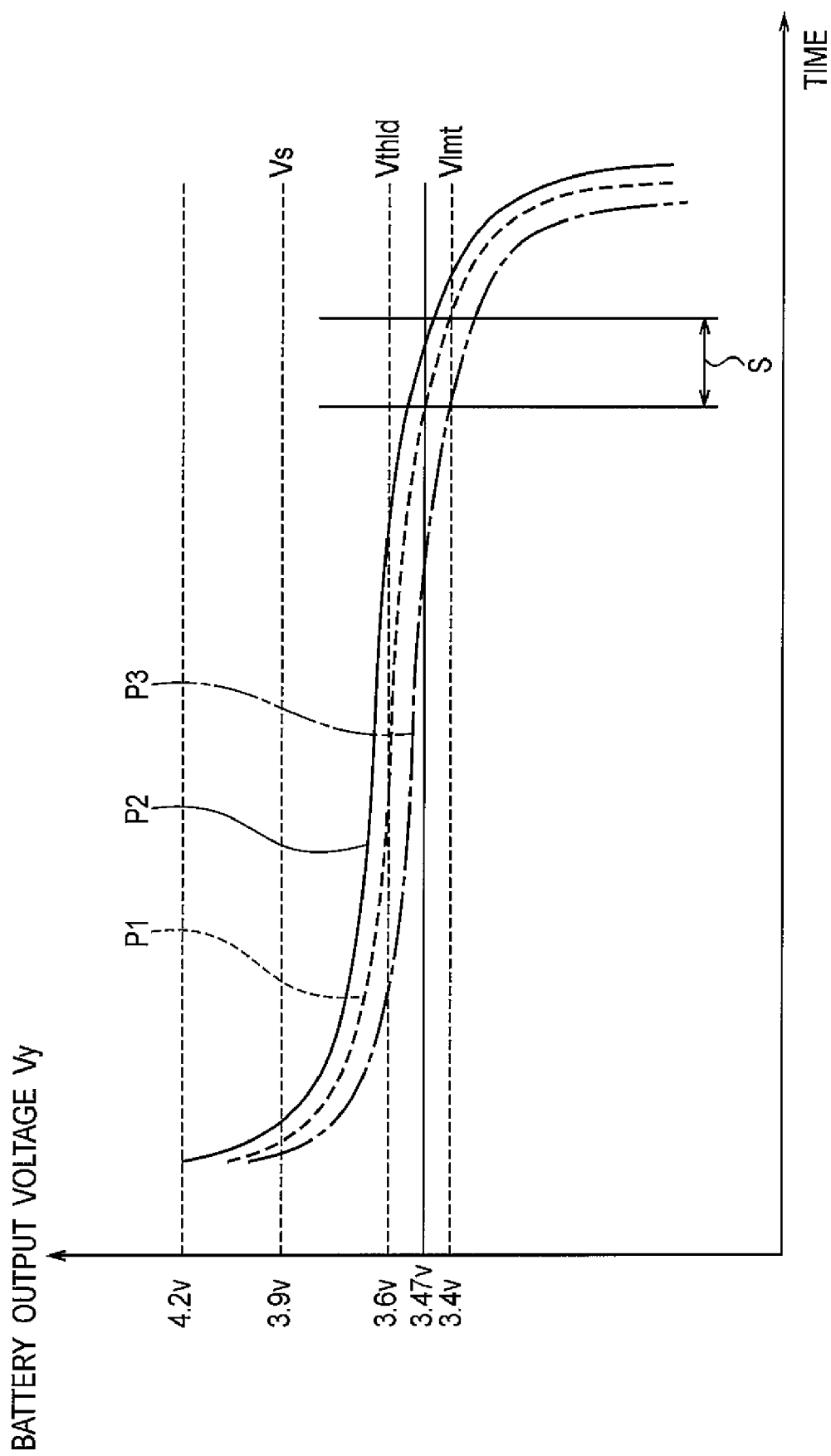
FIG. 7 is a diagram showing an example of changes in an output voltage Vy due to the exhaustion of a battery 119 according to the embodiment of the present invention.

Here, FIG. 7 shows an example of changes of the output voltage Vy due to the exhaustion of the battery 119. A discharge curve P1 shows changing status of the output voltage Vy when the power amplifier $103_1$ of the network connection unit $101_1$ is turned on (see FIG. 3). A discharge curve P2 shows changing status of the output voltage Vy when all of the network connection units $101_1$, $101_2$ and $101_3$ are turned off. A discharge curve P3 shows changing status of the output voltage Vy when the power amplifiers $103_1$ and $103_2$ respectively of the network connection units $101_1$ and $101_2$ are turned on (see FIG. 3).

The lower limit voltage Vlmt is the voltage (3.4 V) which causes a protection circuit (not shown) to operate. Alternatively, the lower limit voltage Vlmt may be a voltage somewhat higher than the voltage which causes the protection circuit to operate. As shown in FIG. 7, the radio communication apparatus 100 can be simultaneously connected to the radio communication networks 1 and 2 only at a point of time before a start point (3.47 V) of a section S. For this reason, in the present embodiment, the threshold voltage Vthld is set at 3.6 V, which is 200 mV higher than the lower limit voltage Vlmt. Additionally, the determination start voltage Vs is set at 3.9 V.

The application 111 is consisted of an application program that realizes the function that the radio communication apparatus 100 provides (for example, voice call application using VoIP).

The speaker 113 outputs a predetermined audible band signal on the basis of control of the application 111 or the operation controller 109. Particularly, in the present embodiment, when a determination is made that the predicted voltage Vexp calculated by the operation controller 109 is lower than the lower limit voltage Vlmt, the speaker 113 can output a beep sound for notifying a user using the radio communication apparatus 100 that the handover to the other radio communication network cannot be executed and the on-going communication may be disconnected.

The microphone 115 converts an inputted voice or the like into an electrical signal, and outputs the electrical signal to the application 111.

The display 117 is formed of a small-sized liquid crystal display. The display 117 displays an image on the basis of control of the application 111 or the operation controller 109.

The battery 119 supplies power needed for the operation of each functional block that constitutes the radio communication apparatus 100. The battery 119 is formed of a cell lithium ion battery in the present embodiment.

The battery voltage monitor 121 monitors the output voltage Vy outputted by the battery 119, as well as the dropped amount Vd of the output voltage Vy resulting from activation of the network connection unit at the time of the handover to the other radio communication network. Specifically, the battery voltage monitor 121 acquires the dropped amount Vd of the output voltage Vy when either one or all of the network connection units $101_1$, $101_2$ and $101_3$ are connected to one or more radio communication networks used in the handover. In the present embodiment, the battery voltage monitor 121 constitutes a voltage detector and a dropped voltage amount acquiring unit.

The battery voltage drop table storage 123 stores a battery voltage drop table TB (see FIG. 6) to which the battery voltage monitor 121 refers. In the present embodiment, the battery voltage drop table storage 123 constitutes a storage unit that stores the battery voltage drop table TB, the battery voltage drop table TB indicating the dropped amount Vd of the output voltage Vy for each of the radio communication networks when the radio communication apparatus 100 is connected to the radio communication network.

Figure 6:
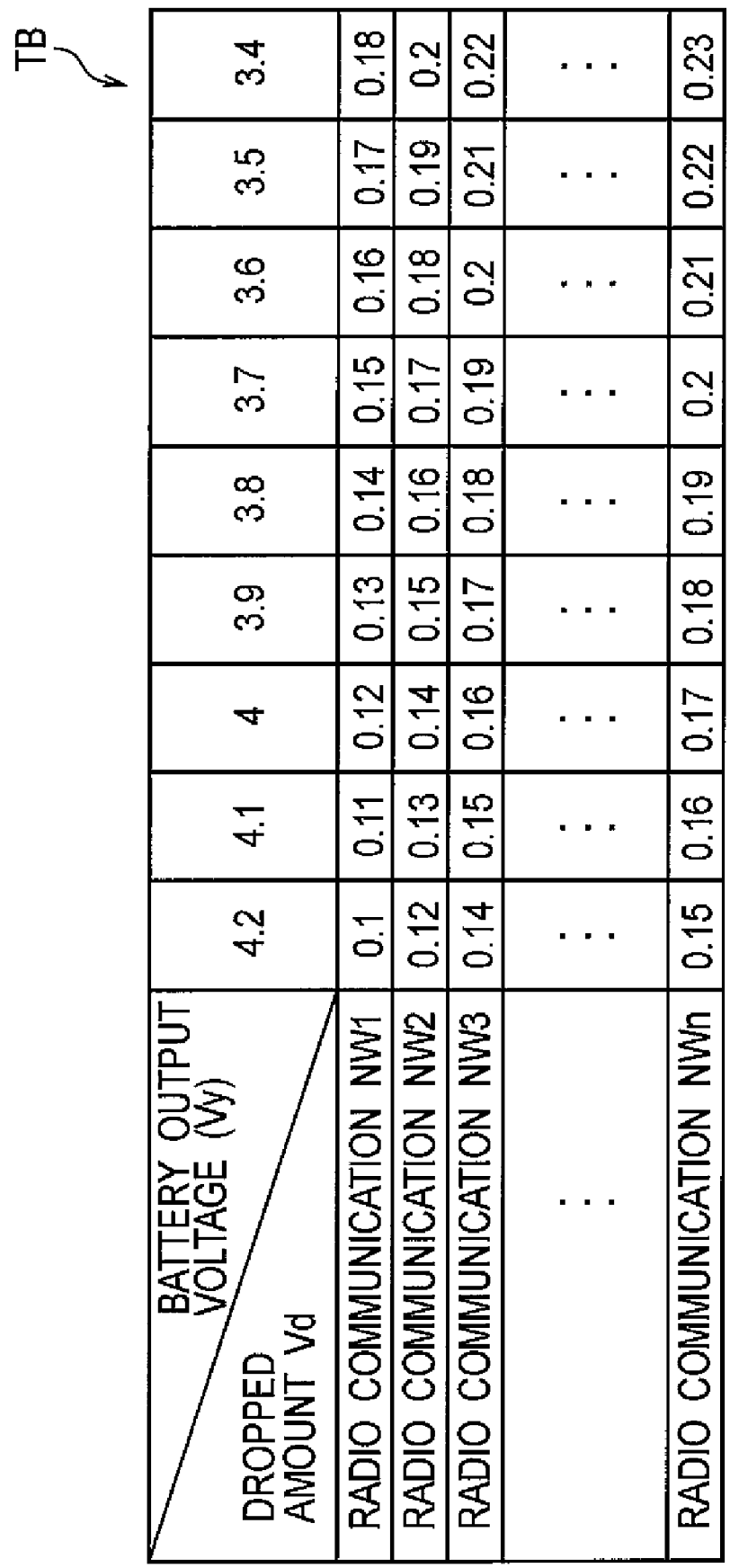
FIG. 6 is a diagram showing an example of a battery voltage drop table TB according to the embodiment of the present invention.

As shown in FIG. 6, the battery voltage drop table TB is constituted by the output voltage Vy and the dropped amount Vd of the output voltage Vy when the radio communication apparatus 100 is connected to each of the radio communication networks.

For example, when the output voltage Vy is 3.9 V, the dropped amount Vd when the network connection unit 101$_1$ is activated in order to connect to the radio communication network 1 is 0.13 V. In other words, the output voltage Vy drops to 3.77 V (3.9 V–0.13 V). Moreover, in order to execute the so-called soft handover, when the network connection unit 101$_2$ is activated in addition to the network connection unit 101$_1$, the dropped amount Vd corresponding to the output voltage 3.77 V is 0.17 V (see the column of battery output voltage 3.7 V in the battery voltage drop table TB).

In other words, in the battery voltage drop table TB, the values of dropped amount Vd of the output voltage Vy in a case where the radio communication apparatus 100 is connected to a predetermined radio communication network are respectively associated with various values (3.4 V to 4.2 V) of the output voltage Vy before the radio communication apparatus 100 is connected to the predetermined radio communication network.

Moreover, when the multiple network connection units are simultaneously activated, determination can be made using the sum of each dropped amount Vd corresponding to the output voltage of the battery at the time of activation.

Other factors for dropping the output voltage Vy exist besides activation of the network connection unit (power amplifier). However, in the present embodiment, assumption is made that the activation of the power amplifier is predominant as a factor for dropping the output voltage Vy. Therefore, prepared is the battery voltage drop table TB indicating the dropped amount Vd due to the presence of activation of the multiple network connection units (power amplifier).

The power supply controller 130 executes voltage conversion for detecting the voltage of the battery 119 with the A/D converter 112.

(2.2) Functional Block Configuration with Respect to Transmission Power Control

Figure 3:
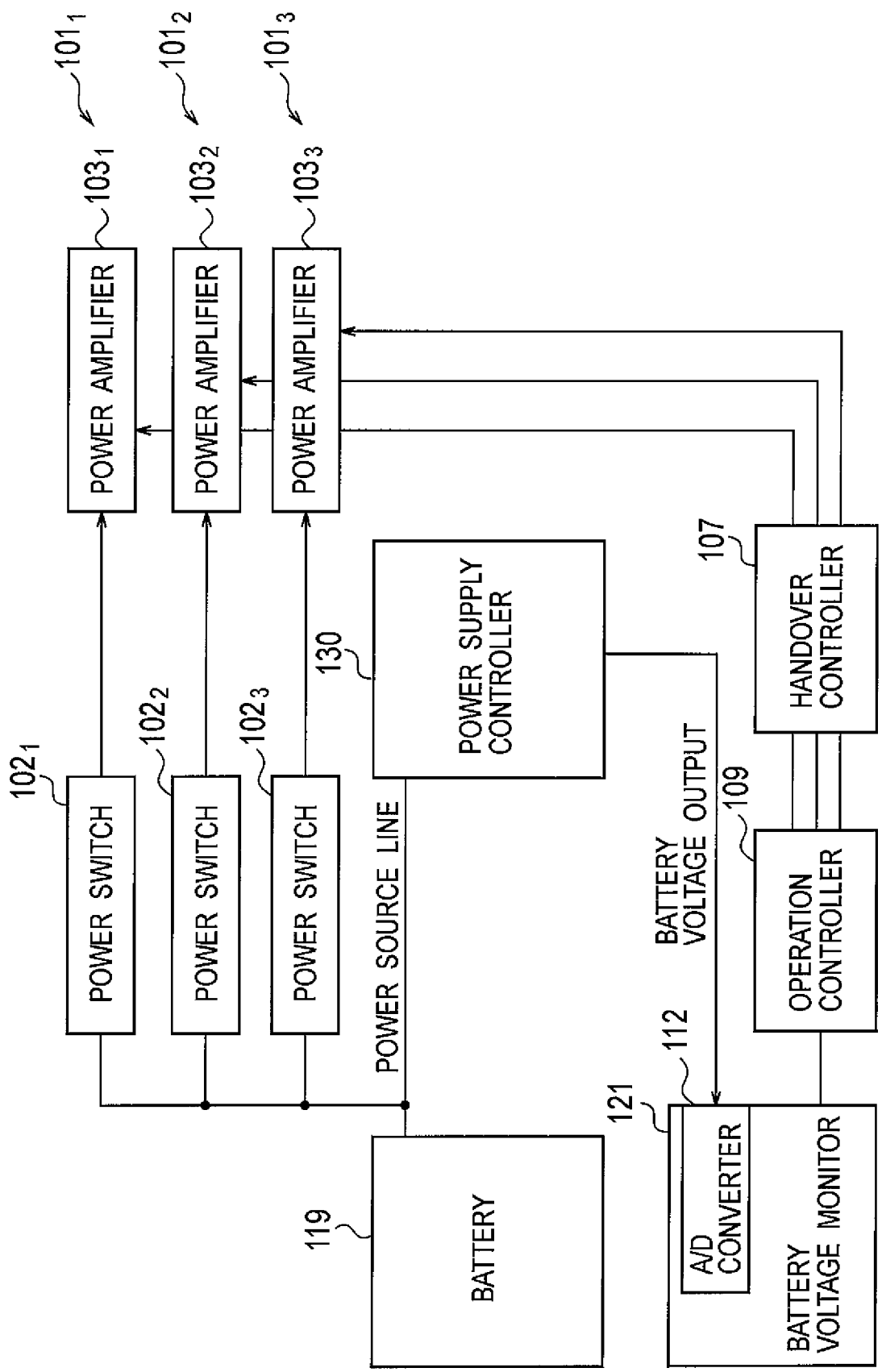
FIG. 3 is a functional block configuration diagram with respect to transmission power control of power amplifiers each provided in network connection units $101_1$, $101_2$ and $101_3$ according to the embodiment of the present invention.

FIG. 3 is a functional block configuration diagram with respect to transmission power control of the power amplifiers respectively provided in the network connection units 101$_1$, 101$_2$ and 101$_3$.

As shown in FIG. 3, the network connection unit 101$_1$ has a power switch 102$_1$ and the power amplifier 103$_1$. Similarly, the network connection units 101$_2$ and 101$_3$ have power switches 102$_2$ and 102$_3$, and the power amplifiers 103$_2$ and 103$_3$ respectively.

The power supply controller 130 is connected to a power source line of the battery 119, and executes voltage conversion to detect the voltage of the battery with the A/D converter 112. The power supply controller 130 is constituted of a power control IC, etc.

The battery voltage monitor 121 detects the output voltage Vy outputted from the power supply controller 130. The battery voltage monitor 121 converts the detected voltage into a digital signal with the A/D converter 112. Then, on the basis of the converted output voltage Vy, the battery voltage monitor 121 monitors the dropped amount Vd of the output voltage Vy resulting from activation of the network connection unit at the time of the handover to the other radio communication network.

The operation controller 109 instructs the handover controller 107 to execute or not to execute the handover to the other radio communication network on the basis of information given by the battery voltage monitor 121, i.e., the dropped amount Vd of the output voltage Vy.

The handover controller 107 determines whether to activate the power amplifiers 103$_1$ 103$_2$ and 103$_3$ on the basis of the instruction from the operation controller 109.

(3) Operation of the Radio Communication Apparatus

Next, operation of the radio communication apparatus 100 will be described. Specifically, description will be given on the operation in which the radio communication apparatus 100 controls to execute or not to execute the handover to the other radio communication network on the basis of the dropped amount Vd of the output voltage Vy of the battery 119.

Figure 4:
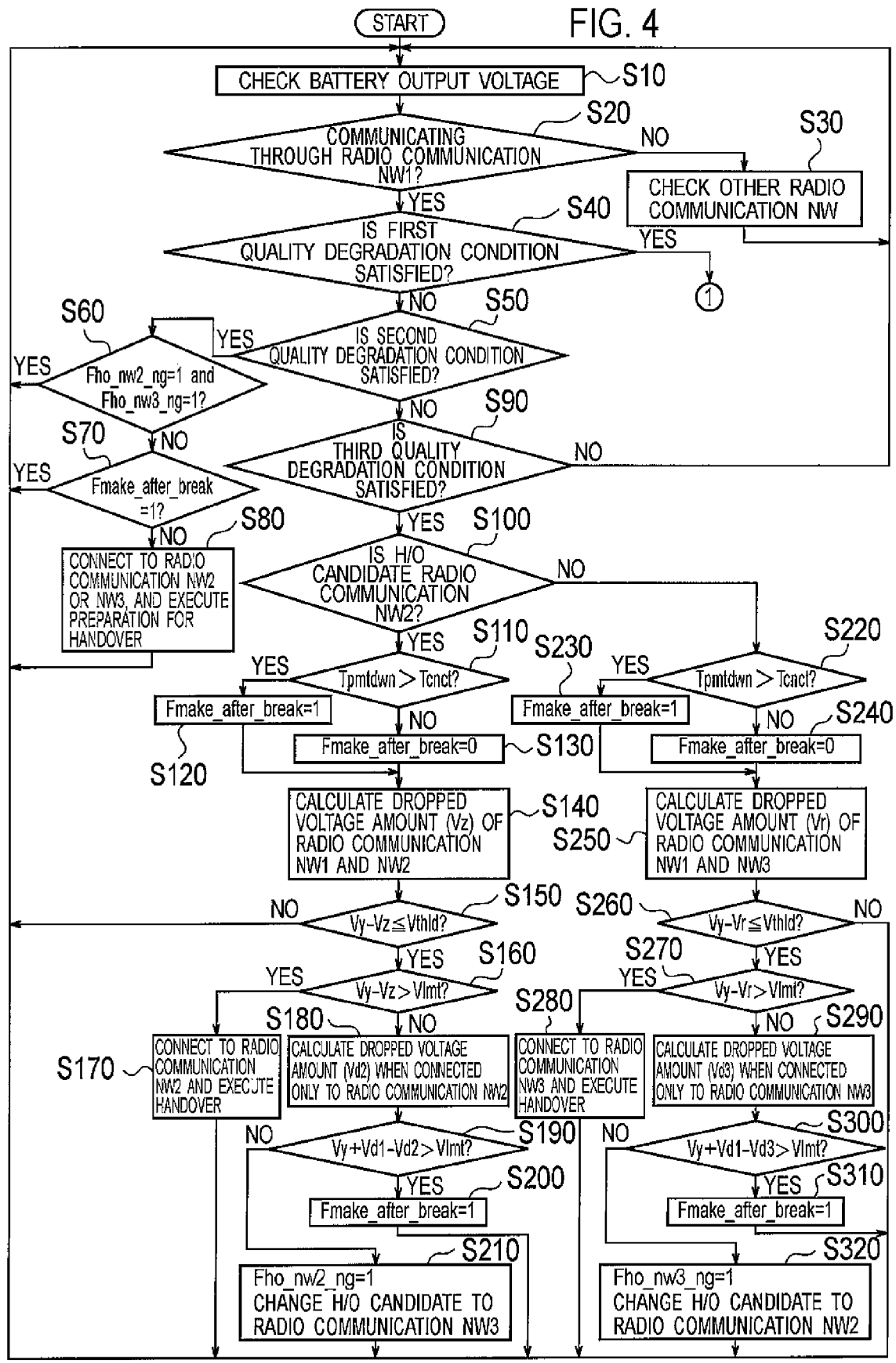
FIG. 4 is a flow chart showing handover operation to other radio communication network by the radio communication apparatus 100 according to the embodiment of the present invention.
Figure 5:
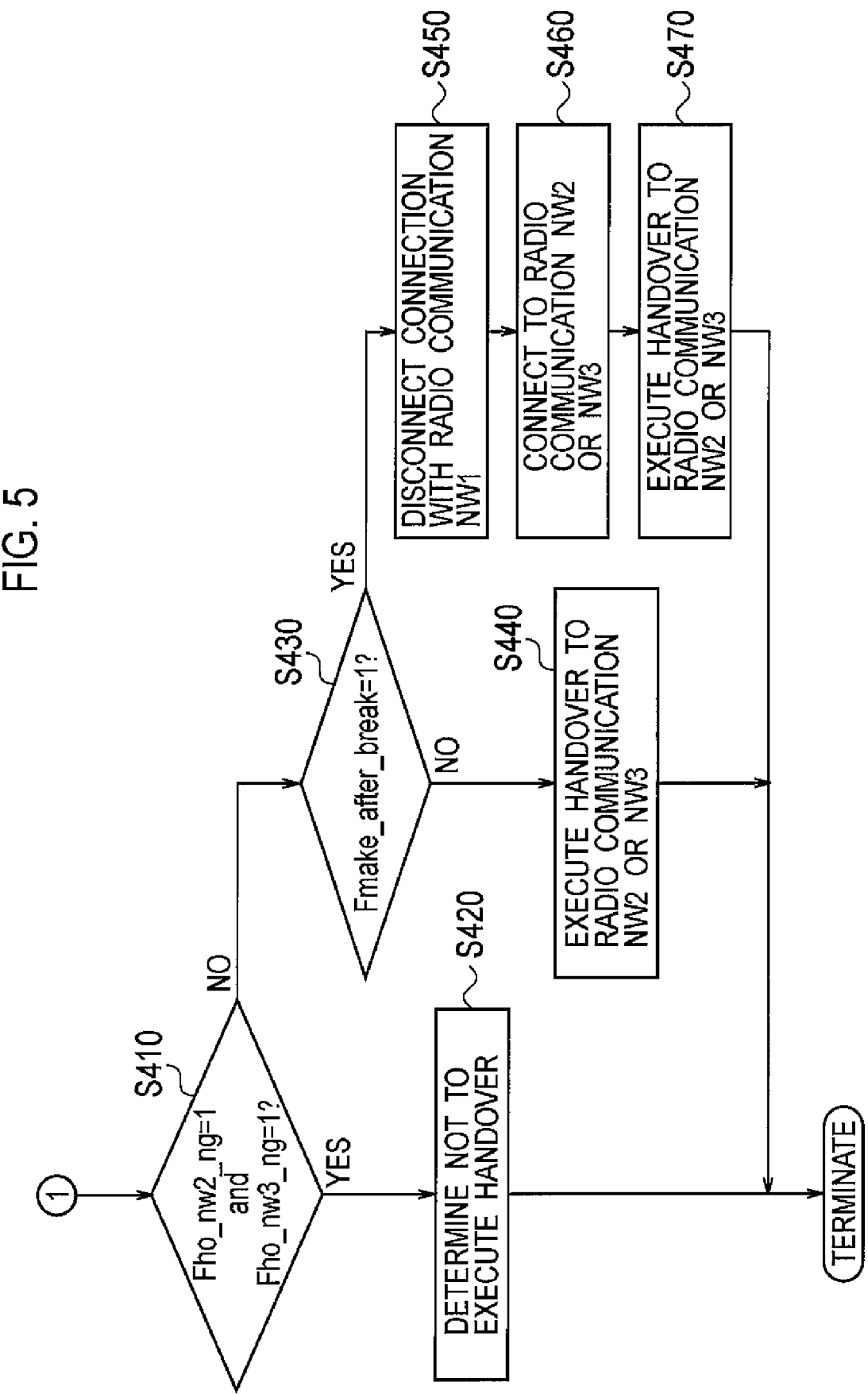
FIG. 5 is a flow chart showing the handover operation to the other radio communication network by the radio communication apparatus 100 according to the embodiment of the present invention.

FIGS. 4 and 5 are flow charts showing the handover operation to the other radio communication network by the radio communication apparatus 100.

As shown in FIG. 4, in Step S10, the radio communication apparatus 100 checks the output voltage Vy of the battery 119.

In Step S20, the radio communication apparatus 100 determines whether or not the radio communication apparatus 100 is connected to the radio communication network 1, and is executing a communication.

When the radio communication apparatus 100 is not connected to the radio communication network 1 (NO in Step S20), in Step S30, the radio communication apparatus 100 transfers to a processing for checking a connection state with the other radio communication network. Note that when the radio communication apparatus 100 is connected to the other radio communication network (radio communication network 2 or 3), the radio communication apparatus 100 also executes the same operations as those in the flows shown in FIGS. 4 and 5. Accordingly, a case where the radio communication apparatus 100 is connected to the radio communication network 1 will be described as an example hereinafter.

When the radio communication apparatus 100 is connected to the radio communication network 1 and is executing the communication (YES in Step S20), in Step S40, the radio communication apparatus 100 determines whether or not the communication quality of the radio signal RS (or information included in the radio signal RS) satisfies the first quality degradation condition.

When the communication quality does not satisfy the first quality degradation condition (NO in Step S40), in Step S50, the radio communication apparatus 100 determines whether or not the communication quality of the radio signal RS satisfies the second quality degradation condition.

When the communication quality satisfies the second quality degradation condition (YES in Step S50), in Step S60, the radio communication apparatus 100 determines a state of a flag indicating the handover to the radio communication network is possible or not. Specifically, the radio communication apparatus 100 checks the content of the flag (Fho_nw2_ng=1) indicating the handover to the radio communication network 2 is possible or not, and the content of the flag (Fho_nw3_ng=1) indicating the handover to the radio communication network 3 is possible or not. The radio communication apparatus 100 determines whether or not the flags are Fho_nw2_ng=1 and Fho_nw3_ng=1.

For example, Fho_nw2_ng=1 indicates that the handover to the radio communication network 2 is impossible. On the other hand, Fho_nw2_ng=0 indicates that the handover to the radio communication network 2 is possible. The state of the flag is set on the basis of the determination result of the dropped amount Vd of the output voltage Vy of the battery 119.

When the flags are neither Fho_nw2_ng=1 nor Fho_nw3_ng=1 (NO in Step S60), that is, when the handover to either one of the radio communication networks is possible, in Step S70, the radio communication apparatus 100 determines a state of a flag indicating whether or not the soft handover to the radio communication network can be executed.

Specifically, the radio communication apparatus 100 checks the content of the flag (Fmake_after_break=1) indicating that a so-called hard handover is to be executed rather than the soft handover in which the radio communication apparatus 100 is simultaneously connected to multiple radio communication networks. In the hard handover, the radio communication apparatus 100 is firstly disconnected from the currently-connected radio communication network and then connected to the radio communication network of a handover destination.

When the flag does not indicate that the hard handover is to be executed (NO in Step S70), that is, when the soft handover can be executed, in Step S80, the radio communication apparatus 100 is connected to the radio communication network 2 or 3 to execute preparation for the handover.

When the communication quality does not satisfy the second quality degradation condition (NO in Step S50), in Step S90, the radio communication apparatus 100 determines whether or not the communication quality of the radio signal RS satisfies the third quality degradation condition.

When the communication quality satisfies the third quality degradation condition (YES in Step S90), in Step S100, the radio communication apparatus 100 determines whether or not a handover destination candidate is the radio communication network 2.

When the handover destination candidate is the radio communication network 2 (YES in Step S100), in Step S110, the radio communication apparatus 100 determines whether or not communication interruption allowable time Tpmtdwn resulting from the handover is longer than time Tcnct needed for connection and authentication to the radio communication network 2 for the handover.

When the communication interruption allowable time Tpmtdwn is longer than the time Tcnct needed for connection (YES of Step S110), in Step S120, the radio communication apparatus 100 sets the flag (Fmake_after_break=1) indicating that the hard handover is to be executed.

When the communication interruption allowable time Tpmtdwn is shorter than the time Tcnct needed for connection (NO in Step S110), in Step S130, the radio communication apparatus 100 sets the flag (Fmake_after_break=0) indicating that the soft handover is to be executed.

In Step S140, while using the radio communication network 1, the radio communication apparatus 100 calculates a dropped amount Vz of the output voltage Vy of the battery 119 when the radio communication apparatus 100 is connected to the radio communication network 2. For example, when the output voltage Vy is 3.7 V, the dropped amount Vz (0.17 V) resulting from the connection to the radio communication network 2 is calculated as shown in FIG. 6.

In Step S150, the radio communication apparatus 100 determines whether or not the predicted voltage Vexp (Vy−Vz) obtained by subtracting the dropped amount Vz from the associated output voltage Vy is not more than the threshold voltage Vthld.

When the predicted voltage Vexp is equal to or less than the threshold voltage Vthld (YES in Step S150), in Step S160, the radio communication apparatus 100 determines whether or not the predicted voltage Vexp is higher than the lower limit voltage Vlmt.

When the predicted voltage Vexp is higher than the lower limit voltage Vlmt (YES in Step S160), in Step S170, the radio communication apparatus 100 is connected to the radio communication network 2, and subsequently, executes the handover, i.e., the soft handover.

When the predicted voltage Vexp is lower than the lower limit voltage Vlmt (NO in Step S160), in Step S180, the radio communication apparatus 100 calculates a dropped amount Vd2 of the output voltage Vy when the radio communication apparatus 100 is connected only to the radio communication network 2.

In Step S190, the radio communication apparatus 100 determines whether or not a value obtained by subtracting the dropped amount Vd2 from a value (Vy+Vd1) is higher than the lower limit voltage Vlmt. Here, the value (Vy+Vd1) is obtained by adding a dropped amount Vd1 when the radio communication apparatus 100 is connected only to the radio communication network 1, to the output voltage Vy in the state where the radio communication apparatus 100 is connected to the radio communication network 1; and the dropped amount Vd2 corresponds to the added voltage value when the radio communication apparatus 100 is connected only to the radio communication network 2.

When the value obtained by subtracting the dropped amount Vd2 from the value obtained by adding the dropped amount Vd1 to the output voltage Vy is higher than the lower limit voltage Vlmt (YES in Step S190), in Step S200, the radio communication apparatus 100 sets the flag (Fmake_after_break=1) indicating that the hard handover is to be executed.

When the value obtained by subtracting the dropped amount Vd2 from the value obtained by adding the dropped amount Vd1 to the output voltage Vy is lower than the lower limit voltage Vlmt (NO in Step S190), in Step S210, the radio communication apparatus 100 sets the flag (Fho_nw2_ng=1) indicating that the handover to the radio communication network 2 is impossible. Additionally, the radio communication apparatus 100 changes the handover destination candidate to the radio communication network 3.

When the handover destination candidate is not the radio communication network 2 (NO in Step S100), i.e. when the handover destination candidate is the radio communication network 3, in Step S220, the radio communication apparatus 100 determines whether or not the communication interruption allowable time Tpmtdwn is longer than the time Tcnct needed for connection. The processings of Steps S220 to S240 are the same as those of Steps S110 to S130.

In Step S250, while using the radio communication network 1, the radio communication apparatus 100 calculates the dropped amount Vr of the output voltage Vy of the battery 119 when the radio communication apparatus 100 is connected to the radio communication network 3. For example, when the output voltage Vy is 3.7 V, the dropped amount Vr (0.19 V) resulting from the connection to the radio communication network 3 is calculated as shown in FIG. 6.

In Step S260, the radio communication apparatus 100 determines whether or not the predicted voltage Vexp (Vy−Vr) obtained by subtracting the dropped amount Vr from the associated output voltage Vy is not more than the threshold voltage Vthld.

When the predicted voltage Vexp is equal to or less than the threshold voltage Vthld (YES in Step S260), in Step S270, the radio communication apparatus 100 determines whether or not the predicted voltage Vexp is higher than the lower limit voltage Vlmt.

When the predicted voltage Vexp is higher than the lower limit voltage Vlmt (YES of Step S270), in Step S280, the radio communication apparatus 100 is connected to the radio communication network 3, and subsequently, executes the handover, i.e., the soft handover.

When the predicted voltage Vexp is lower than the lower limit voltage Vlmt (NO of Step S270), in Step S290, the radio communication apparatus 100 calculates a dropped amount Vd3 of the output voltage Vy when the radio communication apparatus 100 is connected only to the radio communication network 3.

In Step S300, the radio communication apparatus 100 determines whether or not a value obtained by subtracting the dropped amount Vd3 from a value (Vy+Vd1) is higher than the lower limit voltage Vlmt. Here, the value (Vy+Vd1) is obtained by adding an dropped amount Vd1 when the radio communication apparatus 100 is connected only to the radio communication network 1, to the output voltage Vy in the state where the radio communication apparatus 100 is connected to the radio communication network 1; and the dropped amount Vd3 corresponds to the added voltage value when the radio communication apparatus 100 is connected only to the radio communication network 3.

When the value obtained by subtracting the dropped amount Vd3 from the value obtained by adding the dropped amount Vd1 to the output voltage Vy is higher than the lower limit voltage Vlmt (YES in Step S300), in Step S310, the radio communication apparatus 100 sets the flag (Fmake_after_break=1) indicating that the hard handover is to be executed.

When the value obtained by subtracting the dropped amount Vd3 from the value obtained by adding the dropped amount Vd1 to the output voltage Vy is lower than the lower limit voltage Vlmt (NO in Step S300), in Step S320, the radio communication apparatus 100 sets the flag (Fho_nw3_ng=1) indicating that the handover to the radio communication network 3 is impossible. Additionally, the radio communication apparatus 100 changes the handover destination candidate to the radio communication network 2.

As shown in FIG. 5, when the communication quality satisfies the first quality degradation condition (YES in Step S40 of FIG. 4), in Step S410, the radio communication apparatus 100 determines the state of the flag indicating that the handover to the other radio communication network is possible or not. Specifically, the radio communication apparatus 100 checks the content of the flag (Fho_nw2_ng=1) indicating that the handover to the radio communication network 2 is possible or not, and the content of the flag (Fho_nw3_ng=1) indicating that the handover to the radio communication network 3 is possible or not. The radio communication apparatus 100 determines whether or not the flags are Fho_nw2_ng=1 and Fho_nw3_ng=1.

When the flags are Fho_nw2_ng=1 and Fho_nw3_ng=1 (YES in Step S410), in Step S420, the radio communication apparatus 100 determines not to execute the handover to the other radio communication network.

When the flags are neither Fho_nw2_ng=1 nor Fho_nw3_ng=1 (NO in Step S410), i.e., when the handover to either one of the radio communication networks is possible, in Step S430, the radio communication apparatus 100 checks the content of the flag (Fmake_after_break=1) indicating that the hard handover is to be executed.

When the flag does not indicate that the hard handover is to be executed (NO in Step S430), i.e., when the soft handover can be executed, in Step S440, the radio communication apparatus 100 executes the handover to the radio communication network 2 or 3, while maintaining connection to the radio communication network 1.

When the flag indicates that the hard handover is to be executed (YES in Step S430), in Step S450, the radio communication apparatus 100 disconnects the connection to the radio communication network 1.

In Step S460, the radio communication apparatus 100 is connected to the radio communication network 2 or 3.

In Step S470, the radio communication apparatus 100 executes the handover to the radio communication network 2 or 3.

(4) Effects and Advantages

According to the radio communication apparatus 100, the handover to the other radio communication network, i.e., the soft handover is executed in the following case. Specifically, the soft handover is executed in a case where the predicted voltage Vexp obtained by subtracting the dropped amount Vd of the voltage resulting from execution of the handover from the associated output voltage Vy, is not more than the threshold voltage Vthld, and the predicted voltage Vexp is over the lower limit voltage Vlmt. Moreover, when the predicted voltage Vexp is not more than the lower limit voltage Vlmt, execution of the soft handover is stopped. Accordingly, it is possible to prevent the on-going communication from being disconnected due to the drop of the output voltage to the level which causes the protection circuit to operate.

In the present embodiment, the operation controller 109 determines whether or not to stop the handover controller 107 from executing the handover when the communication quality determination unit 105 determines that the communication quality of the radio signal RS deteriorates to a level lower than the third quality degradation condition. Accordingly, the operation controller 109 determines whether or not to stop the handover controller 107 from executing the handover, only when the communication quality of the radio signal RS deteriorates, and the handover is more likely to be executed. In other words, when the communication quality of the radio signal RS is satisfactory and the handover is less likely to be executed, the determination processing can be omitted. Accordingly, reduction of processing load and power saving can be achieved.

In the present embodiment, the operation controller 109 determines whether or not to stop the handover controller 107 from executing the handover when the output voltage Vy detected by the battery voltage monitor 121 is not more than the determination start voltage Vs. In other words, when the output voltage Vy of the battery 119 is sufficiently high, execution of the soft handover to the other radio communication network does not cause the output voltage Vy to reach down to the lower limit voltage Vlmt. Accordingly, when execution of the soft handover does not cause the output voltage Vy to reach down to the lower limit voltage Vlmt, the determination processing can be omitted. Accordingly, reduction of processing load and power saving can be achieved.

In the present embodiment, the radio communication apparatus 100 is controlled so that the output voltage Vy in a case where the radio communication apparatus 100 is connected to a predetermined radio communication network is predicted using: the output voltage Vy before the radio communication apparatus 100 is connected to the predetermined radio communication network; and the dropped amount Vd of the output voltage Vy in a case where the radio communication apparatus 100 is connected to the predetermined radio communication network, the output voltage Vy outputted on the basis of the battery voltage drop table TB. Furthermore, in the battery voltage drop table TB, the values of the dropped amount Vd of the output voltage Vy in a case where the radio communication apparatus 100 is connected to the predetermined radio communication network are respectively associated with the various values of the output voltage Vy before the radio communication apparatus 100 is connected to the predetermined radio communication network. Accordingly, the dropped amount Vd to occur can be accurately predicted before the radio communication apparatus 100 is connected to the predetermined radio communication network.

(5) Other Embodiments

As described above, the content of the present invention has been disclosed through one embodiment of the present invention. However, the descriptions and the drawings constituting a part of the disclosure should not be construed to limit the present invention. Various alternative embodiments should be obvious to those skilled in the art from this disclosure.

For example, in the above-mentioned embodiment, determination is not made as to whether or not to stop the handover controller 107 from executing the handover, when the output voltage Vy is over the determination start voltage Vs and when the quality of the radio-signal RS is in a level better than the third quality degradation condition. Alternatively, the determination may be constantly executed irrespective of the output voltage Vy or the quality of the radio signal RS.

In the above-mentioned embodiment, the battery voltage drop table TB is previously stored in the battery voltage drop table storage 123. Alternatively, the value of the dropped amount Vd of the output voltage Vy may be generated and updated on the basis of an actual measurement result.

As described, obviously, the present invention includes various embodiments not described herein. The technical scope of the present invention is thus defined only by invention identifying matters according to the scope of claims appropriate to the descriptions above.

What is claimed is:

1. A radio communication apparatus that operates with an internal battery and is connectable to a plurality of radio communication networks, the radio communication apparatus comprising:
    a network connection transceiver configured to connect to any one of the radio communication networks using a radio signal;
    a handover processor configured to control a handover from a currently-connected radio communication network to one of other radio communication networks;
    a voltage detector configured to detect a current output voltage outputted by the battery;
    a dropped voltage amount acquiring unit configured to acquire a voltage drop value that would occur as the network connection unit is to be connected to at least one of the other radio communication networks used in the ongoing handover;
    a comparison unit is configured to obtain a predicted voltage by subtracting the voltage drop value that would occur from the current output voltage; and compare the predicted voltage against a predetermined threshold; and detect whether the predicted voltage is no more than said threshold;
    and an operation controller configured to stop the handover controller from executing the handover to the at least one of other radio communication network, upon detecting that the predicted voltage is not more than said threshold.

2. The radio communication apparatus according to claim 1, further comprising:
    a quality determination unit configured to determine whether or not any one of a quality of the radio signal and a quality of information included in the radio signal deteriorates to a level lower than a predetermined condition; wherein
    the operation controller determines whether or not to stop the handover controller from executing the handover, when the quality determination unit determines that the quality deteriorates to a level lower than the predetermined condition.

3. The radio communication apparatus according to any one of claims 1 and 2, wherein
    the operation controller determines whether or not to stop the handover controller from executing the handover, when the output voltage detected by the voltage detector is not more than a predetermined value.

4. A radio communication method used in a radio communication apparatus that operates with a battery and that includes a network connection unit which allows the radio communication apparatus to connect to a plurality of radio communication networks using a radio signal, the radio communication method comprising the steps of:
    controlling a handover by said radio communication apparatus from a currently-connected radio communication network to one of other radio communication networks;
    detecting an output voltage outputted by the battery;
    acquiring a voltage drop value that would occur as the network connection unit is to be connected to the one of the radio communication networks used in the ongoing handover;
    obtaining a predicted voltage by subtracting the voltage drop value that would occur from the current output voltage; and
    comparing the predicted voltage against a predetermined threshold and detecting whether the predicted voltage is no more than said threshold;
    and stopping execution of the handover to the other radio communication network upon detecting that the predicted voltage obtained is not more than a predetermined threshold.

5. A radio communication apparatus that operates with a battery and is connectable to a plurality of radio communication networks, the radio communication apparatus comprising:
    a voltage detector configured to detect an output voltage outputted by the battery; and a storage unit configured to store, for each of the radio communication networks,
    a battery voltage drop table indicating a voltage drop value that would occur in a case where the radio communication apparatus is to be connected to any one of the radio communication networks other than a currently connected network,
    a determination unit configured to obtain a predicted voltage by subtracting the voltage drop value that would occur from the current output voltage, based on which to determine whether or not to execute a handover from a currently-connected radio communication network to other radio communication network;
    a handover controller configured to determine whether the predicted voltage is more than a predetermined threshold on the basis of the determination result of the determination unit, execute a handover from currently-connected radio communication network to other radio communication network when the predicted voltage is more than a predetermined threshold, and to stop execution of the handover from currently-connected radio communication network to other radio communication network when the predicted voltage is not more than the predetermined threshold.

6. The radio communication apparatus according to claim 5, further comprising:

a controller configured to control so as to predict the output voltage when the radio communication apparatus is connected to a predetermined radio communication network among the plurality of radio communication networks, using the output voltage in a case where before the radio communication apparatus is connected to the predetermined radio communication network, and a dropped amount of the output voltage in a case where the radio communication apparatus is connected to the predetermined radio communication network, the dropped amount outputted on the basis of the battery voltage drop table stored in the storage unit.

7. The radio communication apparatus according to claim 5, wherein in the battery voltage drop table, values of the dropped amount of the output voltage in a case where the radio communication apparatus is connected to the radio communication network are respectively associated with a plurality of various values of the output voltage before the radio communication apparatus is connected to the radio communication network.

* * * * *